No. 789,191. PATENTED MAY 9, 1905.
F. L. O. WADSWORTH.
MANUFACTURE OF GLASS.
APPLICATION FILED JAN. 20, 1904.
2 SHEETS—SHEET 1.
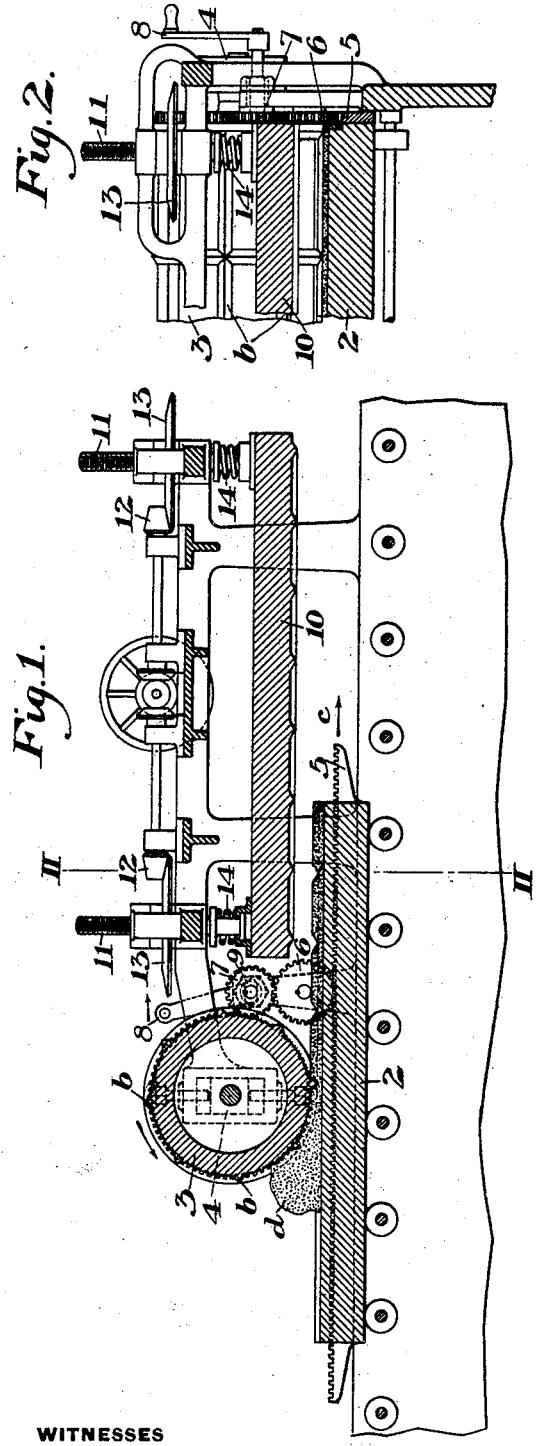
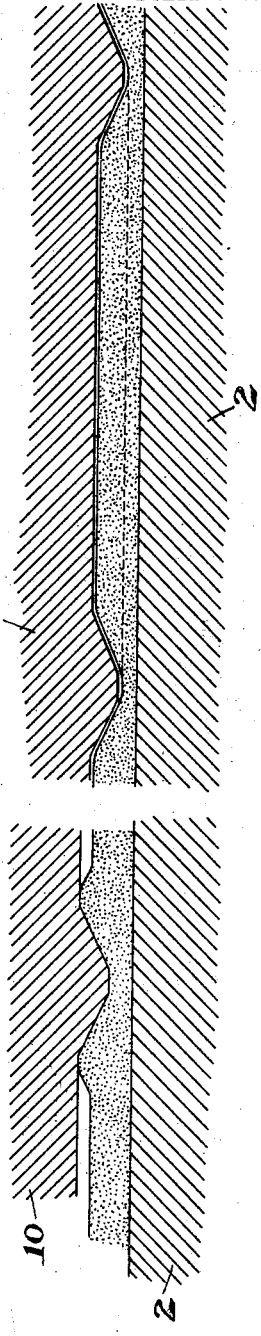
WITNESSES
Thomas W. Bakewell
Warren W. Swartz
INVENTOR
F. L. O. Wadsworth No. 789,191. Patented May 9, 1905.

UNITED STATES PATENT OFFICE.

FRANK L. O. WADSWORTH, OF ALLEGHENY, PENNSYLVANIA, ASSIGNOR TO PRESSED PRISM PLATE GLASS COMPANY, OF NEW YORK, N. Y., A CORPORATION OF WEST VIRGINIA.

MANUFACTURE OF GLASS.

SPECIFICATION forming part of Letters Patent No. 789,191, dated May 9, 1905.

Application filed January 20, 1904. Serial No. 189,828.

*To all whom it may concern:*

Be it known that I, FRANK L. O. WADSWORTH, of Allegheny, Allegheny county, Pennsylvania, have invented a new and useful Improvement in the Manufacture of Glass, of which the following is a full, clear, and exact description, reference being had to the accompanying drawings, forming part of this specification, in which—

Figure 5:
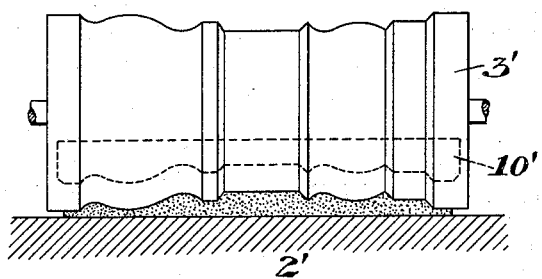
Figure 6:
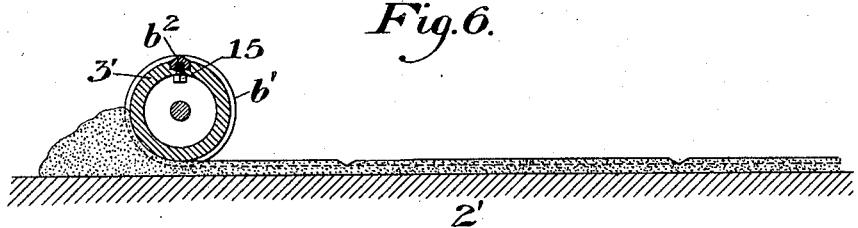
Figure 7:
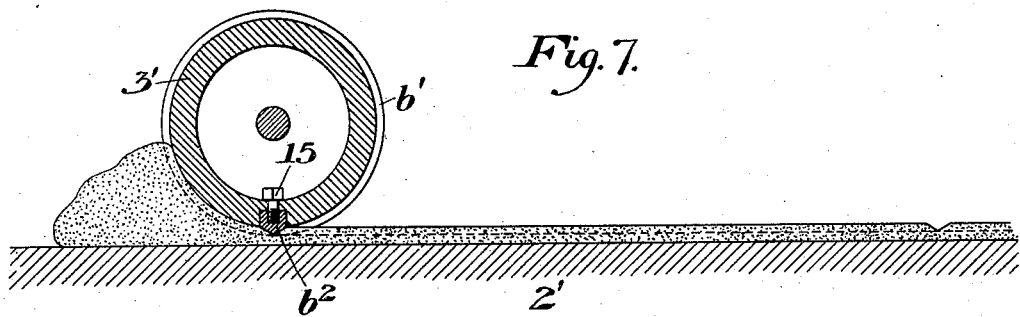

Figure 1 shows in vertical longitudinal section apparatus suitable for the practice of my invention. Fig. 2 is a partial cross-section on the line II II of Fig. 1. Fig. 3 shows the second step of my invention—namely, the pressing of the glass sheet after it has been rolled and the desired contour imparted to its surface. Fig. 4 is a similar view illustrating the evil results which would follow if the initial step of imparting the contour to the sheet by rolling were omitted. Fig. 5 illustrates the first step of my process as applied to the manufacture of glass moldings and like articles; and Figs. 6 and 7 illustrate a modified construction of the roller, the roller used in Fig. 6 being of less diameter than that of Fig. 7 and being adapted, therefore, to produce upon the glass impressions at less distance apart than the roller of Fig. 7.

One purpose for which my invention has been devised is the manufacture of glass mirror-plates having beveled edges. Mirrors of this kind are made in large quantities, and their edges have been beveled by grinding; but the cost of this operation is very considerable and represents, in fact, more than one-half the total cost of manufacture of the mirror.

The purpose of my invention is to provide means by which this can be dispensed with in whole or in part and the mirror-plates formed initially with the required bevel at their margins. The invention is also applicable to other uses, such as the manufacture of glass moldings and like articles, where the surface of a glass plate or sheet is figured with patterns of large size and separated by considerable distance.

My invention consists in forming such glass articles by first distributing a sheet of glass on a table by means of a roller and imparting to it in such operation a surface contour and cross-sectional volume which correspond substantially with that of the finished product, and after the distribution of the sheet has been completed and its plasticity thereby somewhat reduced imparting accuracy and finish to the surface by pressure between dies, one of which has the same surface contour as that which has been imparted to the glass by the operation above mentioned.

The apparatus shown in Fig. 1 is convenient for the practice of my invention; but those skilled in the art will be able to modify it or to substitute for it apparatus of other construction.

2 is a rolling-table, and 3 is a roller mounted above it on bearings 4. The surface of the table is preferably plain, and the roller is provided with a pattern corresponding with that to be imparted to the glass. Thus in rolling plates for mirrors the roller has angular projections *b b* arranged in rectangular or other outline, depending upon the shape and size of the mirror-plates to be produced. The table is reciprocated under the roller by means of a rack 5 on the table meshing with a pinion 6, driven by a spur-wheel 7, which is rotated by a crank 8 or other suitable mechanism and is in gear with teeth on the roller 3, so that the roller will be rotated at the same rate of motion as the table. The bearings of the gear-wheel 7 are mounted in a curved slot 9, so that when the roller is changed gear-wheels of different diameters corresponding to the diameters of the roller may also be substituted and the surface speed of the roller and table maintained the same.

In forming the glass sheet the table moves in the direction of the arrow *c*, and a gathering of glass *d* being placed back of the roller is carried under the roller and is formed thereby into a sheet with a surface contour corresponding to that of the roller and the same as that desired for the finished article. When the table passes beyond the roller, it comes under a vertically-movable pressing-die 10, which is moved by screws 11, of which there may be four in number operated simultaneously by gearing 12 and nuts 13, the screwshafts being provided with springs 14, interposed between them and the upper surface of the die. The under surface of the die has a pattern formed which is the same as that of the pattern of the roll 3, so that when the glass is brought under the die and the die pressed against it the die-pattern will enter the depressions formed by the corresponding pattern on the roller, and the portions of the die will make contact substantially simultaneously over the entire surface of the glass. The function of the die therefore is not to shape or redistribute the glass, but to finish the pattern which has been produced by distribution of the glass by means of roller 3. The pattern produced by such roller is necessarily imperfect, as shown in Fig. 3, for its accuracy is lost during the rolling operation; but as the pattern of the die 10 registers with that produced by the roller and as the action of the die is substantially vertical it restores and finishes the pattern with a high degree of perfection. If it were attempted to dispense with the preliminary rolling operation and to use the die for the purpose of distributing the glass, as well as finishing the pattern, ridges would be thrown up by the projecting portions of the die, as shown in Fig. 4. Such ridges could only be removed by strong pressure, which would result in straining the glass and diminishing or spoiling its commercial value.

In Fig. 5 I show the application of my invention to the manufacture of glass moldings. In this case I employ a roller 3', whose surface has a pattern corresponding to the pattern desired to be produced on the glass sheet, and after this roller has reduced the glass to the form of a sheet with the desired surface contour the glass is pressed by means of a die 10', (shown in dotted lines,) the surface contour of which is substantially identical with that of the roller.

A convenient roller for making the mirror-plates shown in Fig. 3 is illustrated in Figs. 6 and 7, in which the roller-surface is provided with circumferential ribs $b'$, which may be formed by turning the roller in a lathe, and with cross-ribs formed by planing grooves in the surface of the roller, in which are set ribs $b^2$, held in place by screws 15 or otherwise. By using rollers of different diameters, as illustrated in Figs. 6 and 7, the distance between the cross-grooves on the glass may be varied without the necessity of forming more than one line of ribs $b^2$ on any single roller.

When the mirror-plate has been formed, as above described with reference to Figs. 1, 2, and 3, it may be divided into parts by cutting it on the lines of the bases of the grooves formed by the roller and die, and the margins of the pieces so divided will have properly-beveled edges and can be used in the manufacture of mirrors without the necessity of further grinding or finishing; although, if desired, the beveled surfaces may be suitably ground and polished.

Other modifications of my invention and of the apparatus for carrying it into effect may be made by those skilled in the art to adapt it for the manufacture of other articles than those which I have described, since

What I claim is—

1. The method of forming figured glass sheets, which consists in distributing a sheet of glass and thereby imparting to it a surface contour approximating that of the desired product, and, after the temperature of the sheet has been reduced and its rigidity thereby increased, imparting accuracy and finish to the figured surface by pressure from a surface which corresponds substantially in contour to the contour imparted during the distributing; substantially as described.

2. The method of forming mirror-plates, which consists in distributing a sheet of glass and thereby imparting to it a surface contour approximating that of the desired product, and, after the temperature of the sheet has been reduced and its rigidity thereby increased, imparting accuracy and finish by pressure from a surface corresponding substantially to the contour imparted during the distributing operation, and dividing the sheet on the lines of the pattern produced by these operations; substantially as described.

In testimony whereof I have hereunto set my hand.

FRANK L. O. WADSWORTH.

Witnesses:
JOHN MILLER,
H. M. CORWIN.